May 10, 1938.  H. H. KEEN  2,116,661
SUBTRACTING DEVICE
Filed Nov. 2, 1932  6 Sheets-Sheet 1

INVENTOR-
Harold H. Keen
BY
W. M. Wilson
ATTORNEY-

May 10, 1938.  H. H. KEEN  2,116,661
SUBTRACTING DEVICE
Filed Nov. 2, 1932  6 Sheets-Sheet 2

INVENTOR
Harold H. Keen
BY
W. M. Wilson
ATTORNEY

May 10, 1938.  H. H. KEEN  2,116,661
SUBTRACTING DEVICE
Filed Nov. 2, 1932  6 Sheets-Sheet 3

INVENTOR
Harold H. Keen
BY
W. M. Wilson
ATTORNEY

May 10, 1938.  H. H. KEEN  2,116,661
SUBTRACTING DEVICE
Filed Nov. 2, 1932   6 Sheets-Sheet 4

FIG. 6.

Patented May 10, 1938

2,116,661

UNITED STATES PATENT OFFICE

2,116,661

SUBTRACTING DEVICE

Harold Hall Keen, Letchworth, England, assignor, by mesne assignments, to International Business Machines Corporation, New York, N. Y., a corporation of New York Application November 2, 1932, Serial No. 640,741
In Great Britain November 27, 1931

14 Claims. (Cl. 235—61.8)

This invention relates to subtracting mechanism and has for one of its objects to provide an improved device by which the difference between two numbers can be obtained.

According to the present invention, subtracting mechanism comprises, for each denomination, the combination with two devices arranged to be set up to represent respectively a minuend digit and a subtrahend digit, of a pair of subtracting members each movable into any one of a number of positions allocated to different digits and each so controlled by an associated one of the setup devices as to move into the position allocated to the digit represented by that device, whereby the displacement of one of them relatively to the other is representative of the difference between the minuend and subtrahend digits. A manifesting means is then controlled by the pair of subtracting members for indicating, registering or recording the digit represented by the relative displacement between the pair of members. Preferably, the subtracting members are movable in the same direction to an extent that is proportional to or complementary to the digit represented by the setup device controlling it.

Conveniently, one of the pair of subtracting members is provided with a set of "digital" controlling elements, (for example, electrically conducting segments) each allocated to a different digit and arranged to control the manifesting device, to indicate, record or register its digit, and the other member of the pair is provided with a "reading" element (for example, an electrically conducting brush) arranged to cooperate with the digital elements and to select one of said elements, in accordance with the relative displacement between the members, and to render it effective to control the manifesting device.

In order to effect borrowing operations a transfer device is preferably provided between each two pairs of subtracting members allocated to adjacent denominations, which device is arranged to operate under the control of the pair of members of the lower denomination when those members are displaced relatively to one another in a predetermined direction as the result of the subtrahend digit being greater than the minuend digit in the lower denomination, and is operable so to adjust the members of the higher denomination as to reduce by one the digit represented by their relative displacements.

The adjustment of the members on a borrowing operation may be effected by permitting or causing one of the members to move one step, for example, by means of escapement mechanism forming part of the transfer device. Alternatively, and preferably, the adjustment may consist in an alteration in the datum line on one member from which the relative displacement is measured. The reading element referred to above constitutes a datum line by which the relative displacement is measured and it is a feature of this invention to provide an additional reading element arranged to select the digital element next lower in digital value to the digital element selected by the first-mentioned reading element and to arrange the transfer device to determine which of the two reading elements of the associated higher pair of members shall render its selected digital element effective in accordance with whether or not a borrowing operation is to be effected.

If a unit is borrowed from a pair of members which are not displaced relatively to one another and therefore represent zero, a long transfer will have to be effected and a unit borrowed by the members which represent zero from the next higher denomination. This long transfer is preferably effected by arranging each transfer device to be placed by its pair of subtracting members, when they are not displaced relatively to one another and therefore represent zero, under the control of the next lower transfer device in such a manner that the lower device, when operative, renders the higher device operative also.

Subtracting mechanism as described above will show the difference when the minuend exceeds the subtrahend but will give the true complement of the difference when the subtrahend exceeds the minuend. It is a feature of the present invention to provide means for converting the true complement, when it is obtained, into the actual difference and, in order to simplify this conversion, it is preferred to arrange the mechanism so that it obtains either the difference or the nines complement of the difference, that is to say, the number obtained by subtracting each digit of the difference from nine. The nines complement may be obtained by providing a transfer device between the pair of subtracting members for the highest denomination of a bank of such members and the units pair of that bank, whereby the highest pair may borrow from the units pair. This borrowing from the units pair only occurs when the members are obtaining a complement and has the result of converting the true complement into the nines complement which is one less than the true complement.

For many commercial purposes, for example, the preparation of accounts, it is desirable to obtain, from a series of positive and negative items, a credit or positive total, a debit or negative total and a balance between the two totals. The two totals are, in practice, obtained by entering the items selectively into two accumulators of an adding and subtracting machine. The balance is usually obtained by adding all positive items and subtracting all negative items in a third accumulator of the machine, a fourth accumulator in which negative items are added and positive subtracted being used if a negative balance is possible.

Thus, it is a further feature of the present invention to provide an adding and subtracting machine having two accumulators, means for entering positive amounts into one accumulator and negative amounts into the other accumulator, subtracting mechanism as described above, and means for placing, after totals have been obtained in the accumulators one subtracting member of each pair under the control of an associated adding element in one accumulator and the other member of that pair under the control of the corresponding adding element in the other accumulator, the adding elements of the accumulator constituting the setup devices aforesaid. With this machine, the difference between the two totals is obtained in a single operation and the totals may be recorded or registered simultaneously with the obtaining of the difference.

As previously indicated, the subtracting mechanism will contain a complement when the difference is negative and it is a feature of the present invention to provide a machine in accordance with the preceding paragraph in which the manifesting means includes a receptive device, such as an accumulator or a printing or punching mechanism, and translating mechanism arranged to enter into the receptive device either the amount obtained by the mechanism, or alternatively to convert that amount into a nines complement and enter the "nines" complement into the receptive device, selectively depending on whether the amount is a true number or a complement respectively.

Subtracting mechanism in accordance with this invention is applicable to record-card-controlled statistical machines. Such machines may be provided with group control mechanism for taking totals or balances automatically at the end of a series of operations under control of a related group of record cards. The group control mechanism may be used to control the operation of the subtracting mechanism.

The automatic group control mechanism includes a comparing unit which operates to compare a group designation on each card either with the group designation on the preceding card or with a setup in the machine of the group designation on the first card of a group. When the comparing unit detects non-identity, which indicates that the last card of a group has been read, it brings the automatic control mechanism into action to interrupt the card feeding operations of the machine and, if desired, to initiate one or more total recording cycles. In accordance with the present invention the driving mechanism of the subtracting mechanism is so placed under the control of the comparing unit as to be brought into action when the latter detects non-identity. Thus, the subtracting mechanism will operate to obtain a balance at the end of each group of cards. In certain cases the comparing unit is formed in two or more sections, each arranged to detect a change in a different kind of group designation of the cards, such for example, as a major group designation and a minor group designation, and preferably the driving mechanism is arranged to be placed selectively under the control of any one section of the unit.

A record card controlled statistical machine embodying the above and other features of the present invention will now be described by way of example only with reference to the accompanying drawings, in which.

Like reference numerals indicate like parts in all the figures of the drawings.

The machine illustrated in the drawings is generally similar to that described in the U. S. Patent No. 1,762,145 to G. F. Daly et al., and its construction will only be described sufficiently for an understanding of the present invention.

*General arrangement*

The machine comprises a card feeding section, five accumulators (Fig. 1A), and a printing mechanism (Fig. 1), all of a well known construction and similar to those described in the Patent No. 1,762,145.

Figures 3, 4, 9:
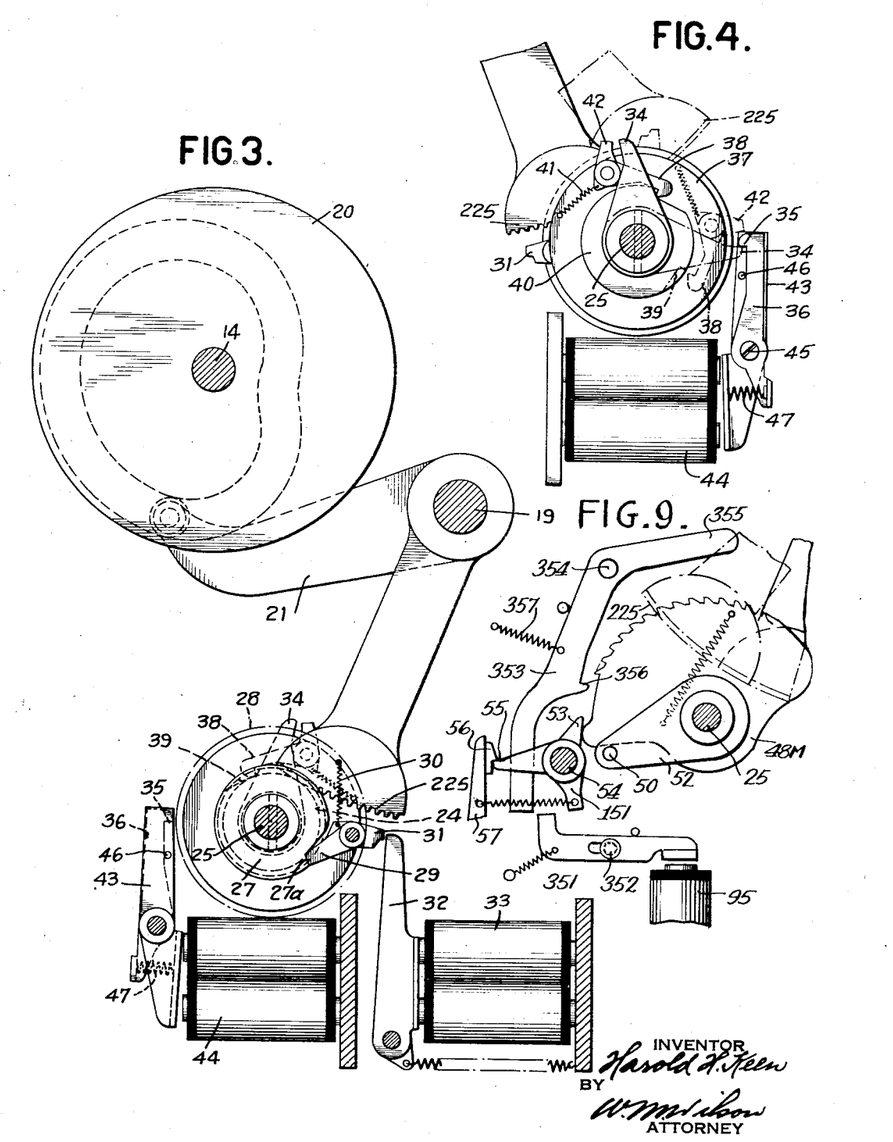
Fig. 3 is a section through the subtracting mechanism of the machine on the lines 3—3 of Fig. 2 and showing cam devices cooperating therewith.
Fig. 4 is a section on the line 4—4 of Fig. 2.
Fig. 9 is a view of a modified transfer mechanism.

During card feeding operations the machine is driven by a motor TM (Fig. 6) which, through a card feed clutch drives the card feeding mechanism, the accumulators and the printing mechanism. During total printing and resetting cycles the machine is driven by a motor RM which drives, through a reset clutch, a printing mechanism, a resetting shaft 13 and a reading-out shaft 14 (Fig. 3). The card feed clutch and the reset clutch are conventional one-revolution clutches and are engaged on the energization of a card feed clutch magnet 15 and a reset clutch magnet 16 respectively (Fig. 6) in a known manner. The accumulators include counter magnets 17 (Figs. 1A and 7) which, when energized, engage clutches 301 to clutch counter wheels 302 to a counter shaft 303 driven by the tabulating motor so that the counter wheels are rotated through differential amounts. The cards are fed one by one firstly past upper brushes UB (Fig. 6) and then past lower brushes LB. Each card passes the lower brushes exactly one cycle after it passes the upper brushes. The counter magnets 17 are energized over circuits established through the lower brushes so as to add amounts read from the cards.

Figure 1:
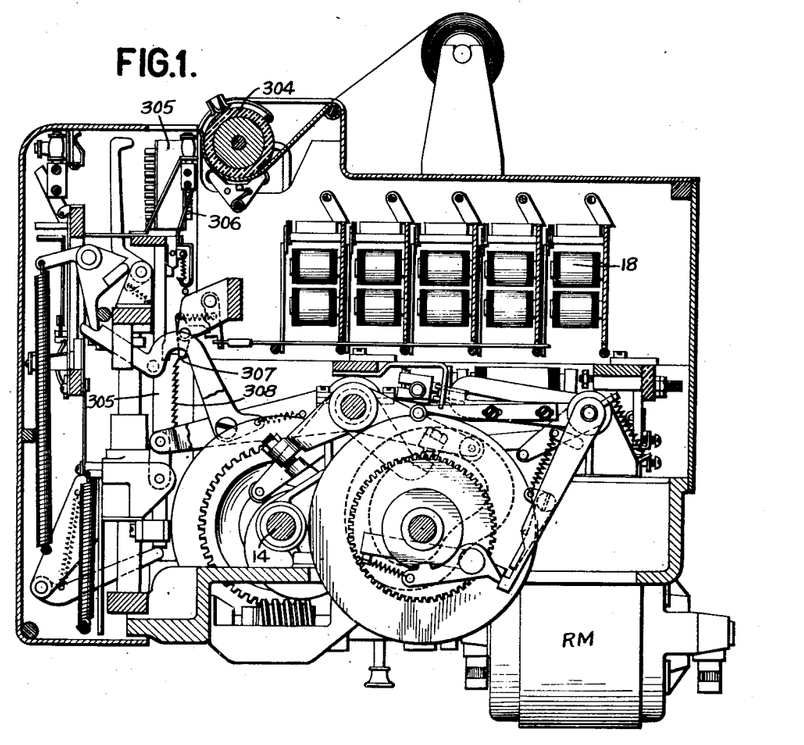
Fig. 1 is a sectional elevation view through the printing mechanism of the machine.
Figure 7:
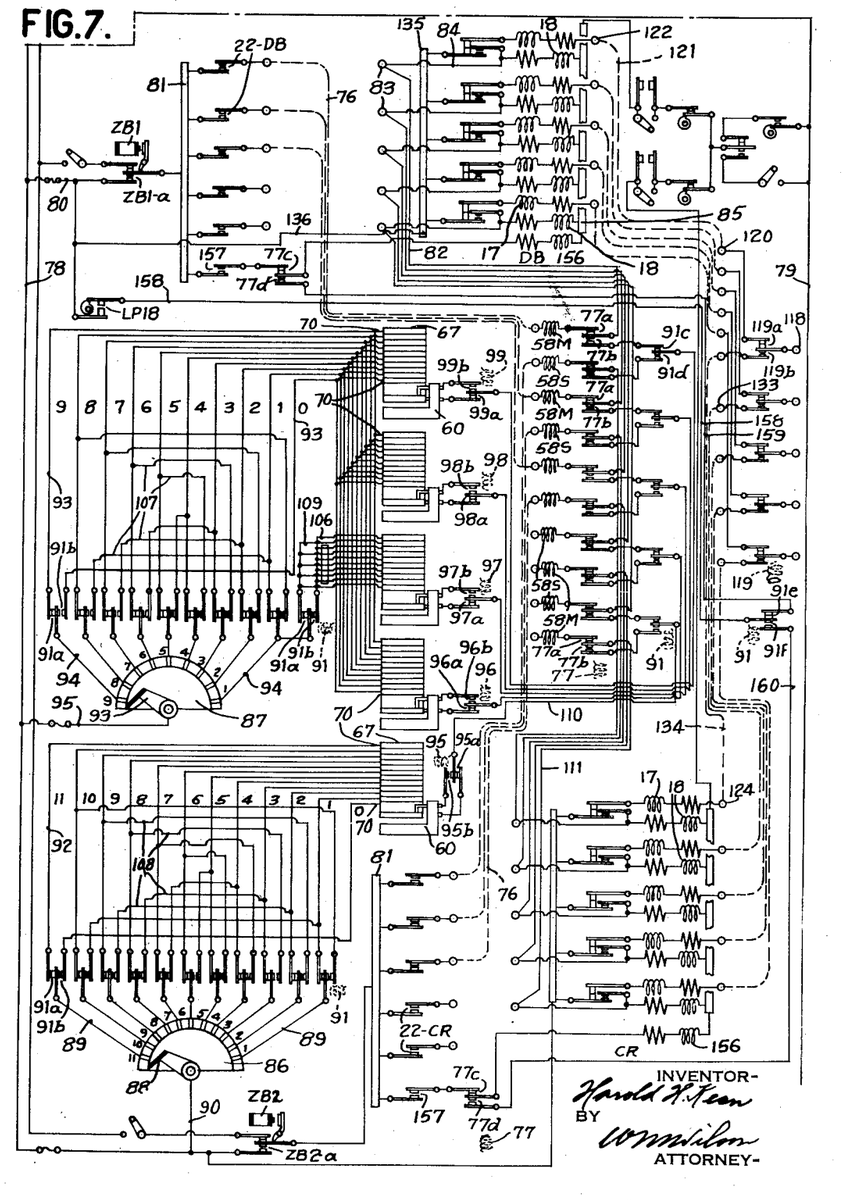

The printing mechanism (Fig. 1) includes a platen 304 past which type bars 305 are raised in synchronism with the cycle of the machine. Each type bar has type 306 for printing the digits nine to naught, or in the case of pence type bars the numbers eleven to naught, the nine or eleven type leading. Each type bar 305 may be arrested in position to print a particular digit on a report sheet on the platen by a pawl 307 which is released to engage a rack 308 on the bar on the energization of a printing magnet 18 (Figs. 1 and 7).

Figure 1A:
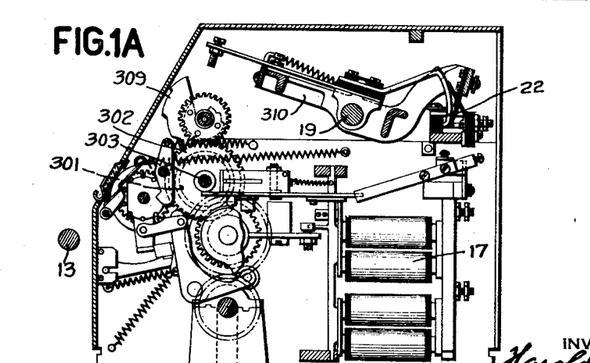
Fig. 1A is a sectional elevation view of an accumulator.

The accumulators are provided with reading-out mechanism of the well known stepped cam type. Each denominational section in an accumulator includes a step cam 309 (Fig. 1A) which is positioned in accordance with the digit registered in that denomination of the accumulator. These cams cooperate with a series of levers 310 which are rocked by suitable mechanism from a rock shaft 19 (Fig. 3). This shaft in turn is rocked by a cam 20 secured on the reading-out shaft 14 through a lever 21; the levers are rocked towards the stepped cam in synchronism with the rise of the type bars 305 past the platen. Each lever 310 will be arrested after a movement depending on the position of its stepped cam and when arrested closes a pair of reading-out contacts 22 (Figs. 1A and 7). As will be explained later, these contacts, as they close, complete circuits to the printing magnets 18 which arrest the type bars 305 in position to print the total.

Subtracting mechanism

The machine is provided with subtracting mechanism which is illustrated in Figs. 2 to 5 and will now be described. The mechanism is driven by the reading-out shaft 14 through the rock shaft 19 in synchronism with the movement of the reading-out levers of the accumulators. The shaft 19 carries an arcuate rack 225 (Fig. 3) which meshes with a pinion 24 mounted to rotate on a shaft 25. The shaft 25 is mounted to rotate in suitable bearings in end plates 26 of the subtracting unit.

A clutch disk 27 is secured to the wheel 24 and has a single notch 27a. A disk 28 is secured to the shaft 25 and a pawl 29 is pivoted on this disk. The pawl 29 is urged by a spring 30 against the periphery of the disk 27 but is normally held away from the disk by the engagement of its tail 31 with the top of an armature 32 of a subtracting magnet 33. Thus, normally, when the rack 225 is rocked, no drive will be transmitted to the shaft 25. If, however, the magnet 33 is energized, when the rack 225 rocks clockwise, its armature 32 will release the pawl 29 which will move to the position shown, engaging the notch 27a. Then, as the rack 225 rocks clockwise and rotates the wheel 24, the disk 28 and shaft 25 will be rotated anticlockwise until the nose of a stop member 34 secured to it engages beneath the nose 35 of a latch 36, as shown in chain lines in Fig. 4. The rack 225 can then be restored counterclockwise, the pawl 29 sliding over the surface of the disk 27 while the shaft 25 is held in the position shown by the latch 36.

A disk 37 is secured to the wheel 24 and carries a pivoted pawl 38. This pawl is normally urged into engagement with a notch 39 in a disk 40 by a spring 41. The disk 40 is secured to the shaft 25. When the rack 225 reaches its outermost position, as shown in chain lines in Fig. 4, the tail 42 of the pawl 38 engages the top of the armature 43 of a magnet 44 and is rocked away from the notch 39. The magnet 44 is normally deenergized and its armature is in the position shown. The disengagement of the pawl 38 from the notch 39 allows of the wheel 24 being restored to its initial position by the rack 225, while the shaft 25 remains in its displaced position. The latch 36 is pivoted at 45 on the armature 43 and is pressed against a stop 46 by a spring 47.

It should be explained that the reading-out levers previously mentioned are rocked during the first half of a total printing cycle and that the type bars are positioned and printing is effected also during this first half. The second half of these cycles is set aside for the resetting of the accumulators to zero, if desired. The rack 225 is rocked to its outer position and restored during a single total printing cycle, two of which are required for a complete cycle of operations of the subtracting mechanism. It has just been explained how the shaft 25 is rotated during the first half of the first total printing cycle. It remains in this position during the second half of the first total printing cycle and the first half of the second total printing cycle. Towards the end of the first half of the second total printing cycle the restoring magnet 44 is energized and attracts its armature 43, thus moving the nose 35 of the latch 36 free of the nose of the stop member 34 and also moving the end of the armature out of the path of movement of the tail 42 of the pawl 38. Thus, the pawl 38 will not be disengaged from the notch 39 during the second total printing cycle so that, when the rack 225 is restored to its initial position and rotates the wheel 24 (clockwise in Fig. 3 and anti-clockwise in Fig. 4), the movement of the wheel will be transmitted through the pawl 38 to the disk 40 and therefore to the shaft 25 which will be rotated back to its initial position.

The mechanism just described is provided in duplicate, one at each end of the unit. Both these mechanisms drive the same shaft 25 which extends right through the unit.

Ten pairs of subtracting members are mounted to rotate on the shaft 25. Each pair of members includes a minuend member and a subtrahend member and forms a denominational section of the subtracting mechanism. Each member includes a sector 48 (Fig. 5) which has a surface 49 held against a pin 50 by a spring 51. The pin 50 is provided in the end of an arm 52.

Each arm 52 cooperates with two adjacent segments, (excepting the two extreme arms) and is secured to the shaft 25. Thus, as the shaft 25 rocks anti-clockwise (Figs. 3 and 5) the arms 52 will draw, through the springs 51, the sectors 48 after them. Each sector 48 cooperates with a detent pawl 53 which is mounted on a shaft 54 and has a tail 55. Normally, the tail 55 of each pawl is engaged by the nose 56 of an armature 57 of a control magnet 58. A spring 59 serves to hold the armature 57 away from the core of the magnet 58 and also to urge the pawl 53 towards the associated sector 48.

Figure 2:
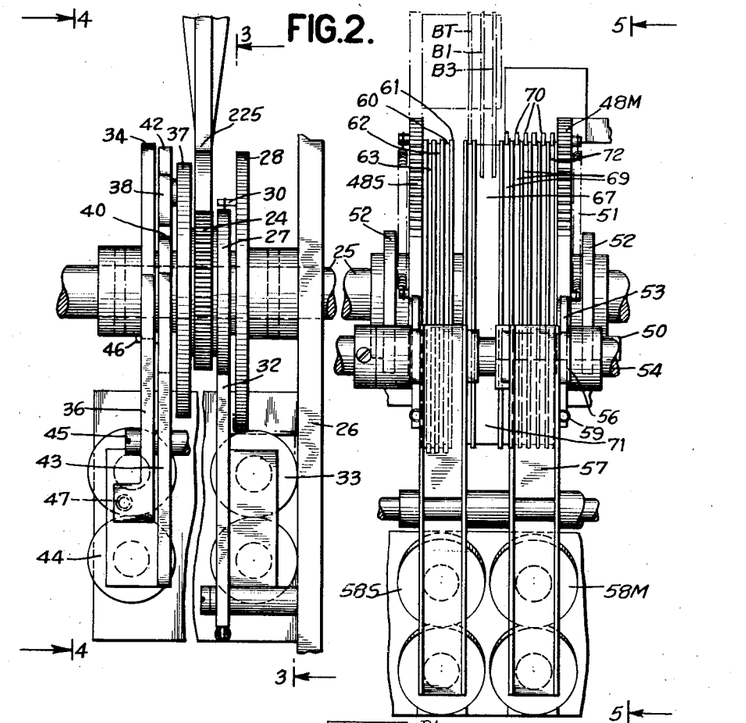
Fig. 2 is a front elevation of a portion of the subtracting mechanism of the machine.

Each sector 48 is formed with rack teeth which are moved past the nose of the pawl 53 in synchronism with the passage of the printing type past the printing position and the magnets 58 are energized through the reading-out contacts 22 in the manner which will be described in detail later. Thus, the magnets 58 will be energized simultaneously with the printing magnets 18 and will attract their armatures, releasing the pawls 53, which will engage and arrest the sectors 48 in positions corresponding to the totals read out of the accumulators. In Fig. 2 a pair of subtracting members are shown and the sector of the minuend member is designated 48M while that of the subtrahend member is designated 48S. The magnet controlling the sector 48M is designated 58M while that controlling the sector 48S is designated 58S. The ten magnets 58M are controlled by the reading-out contacts 22 of one accumulator while the ten magnets 58S are controlled by the contacts 22 of another accumulator. Thus, the sectors 48M will be positioned in accordance with a minuend amount read from one accumulator while the sectors 48S are positioned in accordance with a subtrahend amount read from the other accumulator.

Figure 5:
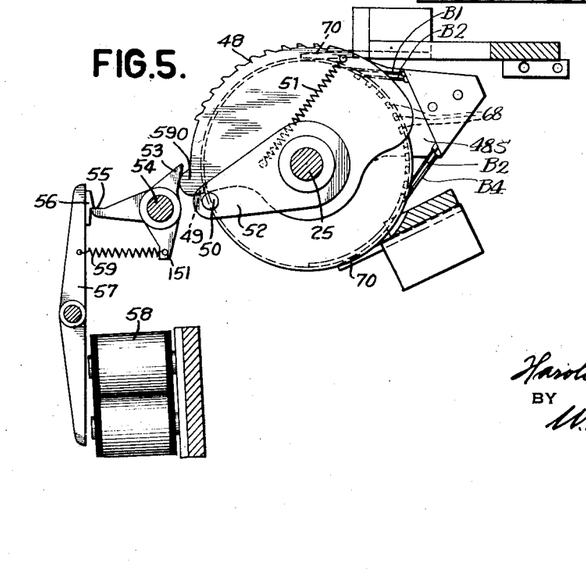
Fig. 5 is a section on the line 5—5 of Fig. 2.

The sectors 48M and 48S are positioned during the first half of the first total printing cycle and remain in this position until the second half of the second total printing cycle, when the shaft 25 is restored and, through the arms 52 and pins 50 positively, restores the sectors to the position shown in Fig. 5. As the sectors move into this position a camming projection 59O on each sector engages the associated pawl 53 and relatches it beneath the nose 56 of the associated armature 57.

Figure 8:
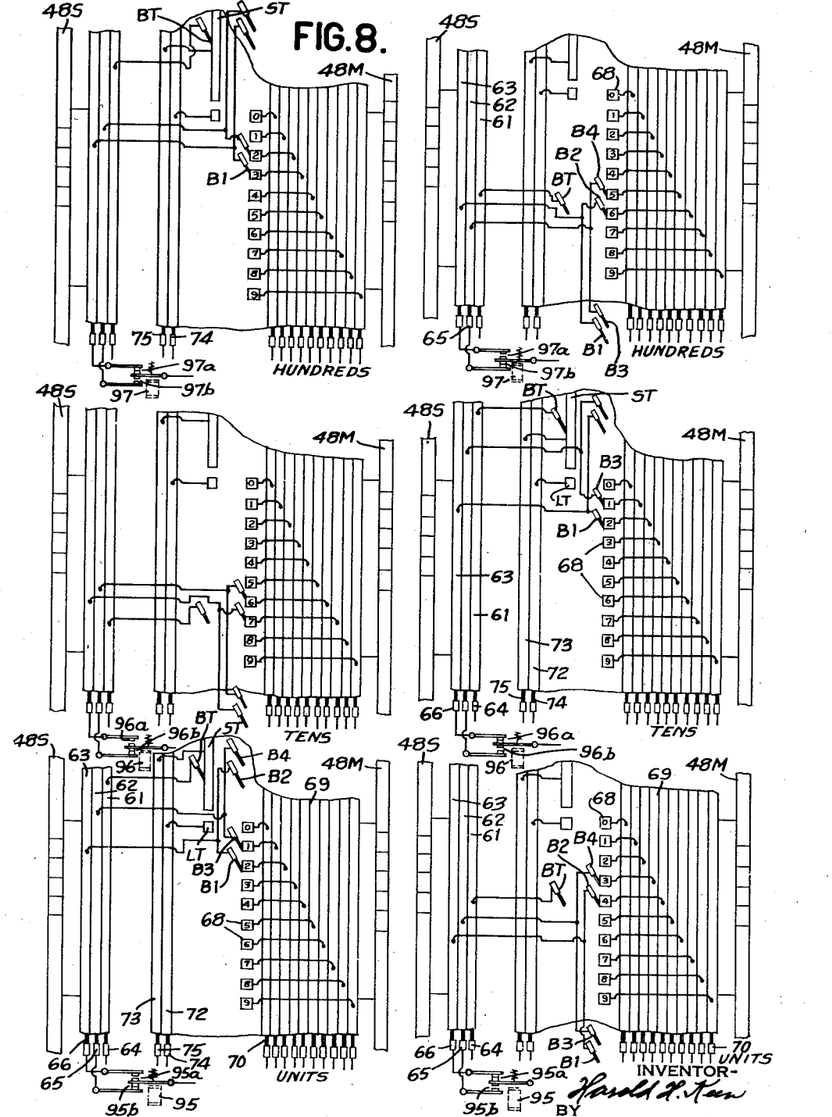
Fig. 8 is a diagram illustrating the position of parts of the subtracting mechanism for two electrical computations.

The subtrahend sector 48S is fastened to an electric commutator 60 having three collecting rings 61, 62 and 63. These rings are engaged respectively by brushes 64, 65 and 66 (Fig. 8). Each subtrahend sector 48S also carries two pairs of reading brushes B1, B2 and B3, B4, and a transfer brush BT. The brush BT is insulated from the other brushes but is connected to the segment 61 (Fig. 8). The brushes B1, B2 are electrically connected together and to the segment 63, while the brushes B3, B4 are electrically connected together and to the segment 62.

Each minuend sector is secured to a commutator 67 having a circumferential row of ten conducting segments 68 (Fig. 8) which cooperate with the brushes B1, B2, B3, and B4 of the associated subtrahend sector. Each segment 68 is allocated to a separate digit and is connected to a separate one of ten collecting rings 69 carried by the commutator 67 and each cooperating with a separate fixed brush 70. Normally the brush B2 contacts the "zero" segment 68, Figs. 5 and 8, at the same time that the other brush B3 contacts the "nine" segment. If the sector 48M moves more than the sector 48S, then the brushes B1, B3 are effective, but if the sector 48S moves more than the sector 48M, then the other brushes B2 and B4 are effective. It should be noted that in the case of the lowest denomination which is that allocated to pence in the present case (Fig. 7) there are twelve segments 68 and twelve rings 69 and the sectors in this denomination can take up any one of twelve positions instead of any one of ten positions, as in the remaining denominations. In the diagrammatic Fig. 8 the rings 69 are shown arranged side by side, but in practice, in order to reduce the axial length of the commutator 67 the rings are constituted by semi-circular segments arranged in pairs, the segments of each pair being on opposite sides of the commutator so that only half the rings are visible in Fig. 2. It is for this reason that two sets of brushes 70 are provided as shown in Fig. 5. One of these sets cooperates with the segments on one side of the commutator and the other with the segments on the other side. The brush BT cooperates with a section 71 of the commutator 67. This section contains a long transfer spot LT (Fig. 8) with which the brush BT is in engagement when the sectors are in their initial position and a short transfer segment ST which is so positioned that the brush BT will engage it when the subtrahend sector 48S is positioned in advance of the minuend sector.

The commutator 67 carries two segments 72 and 73 arranged on its opposite sides in the same way as the rings 69 and connected respectively to the long transfer segment LT and the short transfer segment ST. These rings cooperate respectively with brushes 74 and 75 (Fig. 8).

*Subtracting circuits*

Before describing the general operation of the machine the manner in which subtraction is performed will be explained first with reference to Figs. 7 and 8. In Fig. 7 two five-denominational accumulators are shown conventionally at DB and CR. There are thus two sets of five pairs of reading-out contacts 22. The contacts 22—DB are associated with the debit accumulator DB into which all debit amounts are entered, as will be explained later, while the contacts 22—CR are associated with the credit accumulator CR which accumulates credit amounts. In this figure five pairs of subtracting members are shown conventionally, these pairs being arranged to deal with tens and units of pounds, tens and units of shillings and pence. By means of plug connections 76 the contacts 22—DB are connected to the magnets 58M, like denomination to like denomination and in the same way the contacts 22—CR are connected to the magnets 58S. Associated with the magnets 58 are the contacts 77a, 77b of a multi-contact relay. As previously explained, a balancing operation includes two total printing cycles during the first of which the contacts 77a are closed and the contacts 77b open, while during the second the contacts 77b are closed and the contacts 77a are opened. The manner in which this is effected will be explained later.

It will be assumed that a total of the credit items of a group of cards has been obtained in the accumulator CR and a total of the debit items of that group in the accumulator DB. It will also be assumed that both accumulators are to be reset in which case magnets ZB1 and ZB2 (Fig. 7) will be energized, as will be explained later, and will have closed their contacts ZB1a and ZB2a. Current is supplied to the circuits of the machine through main supply lines 78 and 79. During the first total printing cycle of a balancing operation, circuits are established by the closure of the contacts 22—DB and extending from the line 78 through a line 80, the contacts ZB1a, a bus 81, a pair of contacts 22—DB, one of the plug lines 76, one of the magnets 58M the connected contacts 77a, a line 82, a plug socket 83, a line 84, one of the printing magnets 18, and a bus 85 to the line 79 through the usual controlling contacts. This will result in the simultaneous energization of the magnet 18 and the magnet 58M. The magnet 18 will arrest its type bar 305 in position to print the digit of the total in the corresponding denomination while the magnet 58M will arrest the associated sector 48M in position to represent a minuend digit. The actual movement of the sector will be complementary to the value of the digit it is to represent, since, as is usual in such machines, the impulses represent, by their timing in the cycle of the machine, the digits in the reverse order, that is, in the order 9, 8, . . . 1, 0. It is for this reason that the type are arranged, as mentioned above, on the type bars with the nine type leading. Similar circuits are established through the contacts 22—CR to energize the magnets 58S and the printing magnets 18 of the accumulator CR. Thus, at the end of the cycle both the debit total and the credit total will be printed and the sectors 48M and 48S will be positioned in accordance with these totals.

The machine is provided with two impulse emitters 86 and 87. The emitter 86 includes a brush 88 which is driven by the reset motor in synchronism with the rise of the type bars during total printing and sweeps over a number of conducting segments so as to connect each of a number of lines 89 in turn to a line 90. There are eleven lines 89 and each is allocated to a different duo-decimal digit and is connected through contacts 91a to a separate line 92. The lines 92 are in turn connected to the brushes 70 of the lowest or pence commutator 67. Thus, the digital segments 68 of this commutator 67 will each receive an impulse at the particular time representative of the digit to which it is allocated. The emitter 87 also includes a brush 93 which connects each of nine lines 94 in turn to a line 95 in synchronism with the rise of the decimal type bars. The circuits extend in this case through contacts 91a to lines 93 which are connected to the brushes 70 for the tens and units of pounds and units of shillings commutators 67. The line 94 which receives an impulse at the "one" time in the cycle is connected by one of the pairs of contacts 91a to a line 109. This line is connected to the "one", "three", "five", "seven" and the "nine" digital segments 68 on the tens of shillings commutator 67 via the brushes 70.

Printing a positive balance

The actual subtracting and balance printing operations may best be understood by reference to Fig. 8. The right hand side of this figure shows diagrammatically the position of three pairs of subtracting sectors in the positions assumed when 382 is subtracted from 906. Considering first the units pair which are positioned to subtract 2 from 6 and are shown in the lower right hand corner of Fig. 8. The minuend sector will have advanced until the fourth tooth, counting in a clockwise direction (Fig. 5) has been engaged by the pawl 53, while the subtrahend sector will have moved further till the eighth tooth has been engaged by its pawl 53. Thus, the subtrahend sector will move four steps in advance of the minuend sector.

The brush B2 is normally in engagement with the zero digital segment 68 so that after the sectors have been positioned it will be in engagement with the "four" digital segment, as shown in Fig. 8. This positioning occurs during the first total printing cycle and during the second total printing cycle a circuit is established through an emitter such as emitter 87 (Fig. 7) at the "four" time in the cycle, over one of the lines 93, one of the brushes 70, one of the segments 69, the "four" segment 68, Fig. 8, the brush B2, the segment 63, the brush 66, normally closed transfer contacts 95a, a line 110, one pair of normally closed contacts 91C, one pair of the contacts 77b (which have now been closed), a line 82 and the proper printing magnet 18 to the line 79. This printing magnet 18 will arrest its type bar in a position to print "four". It will be seen that which digit is printed is determined by which segment 68 the brush B2 rests on and that emitters 86 and 87 serve merely to time a circuit established through the brush B2 in accordance with the digit to be printed.

In the tens denomination the subtrahend digit (eight) exceeds the minuend digit (zero) and the sectors 48S and 48M are in the positions shown to the right center of Fig. 8. The minuend sector has moved until its tenth tooth is engaged by its pawl 53 while the subtrahend sector has only moved until its second tooth has been engaged by its pawl 53. Thus, the minuend sector has moved eight steps further than the subtrahend sector. This has positioned the brush B1, which is normally positioned beyond the "nine" segment 68, on the "two" segment 68, so that a circuit will be established through the "two" segment 68, the brush B1, the segment 63, and hence, through the contacts 96a, to the proper printing magnet 18 which will be energized at the "two" time in the cycle so that "2" will be printed. The machine has in fact subtracted eight from ten and one must therefore be borrowed from the next higher denomination. It will be noted that the brush BT rests on the short transfer segment ST so that a connection is made from the brush 75, through the segment 73, the segment ST, the brush BT and the segment 61 to the brush 64.

Figure 6:
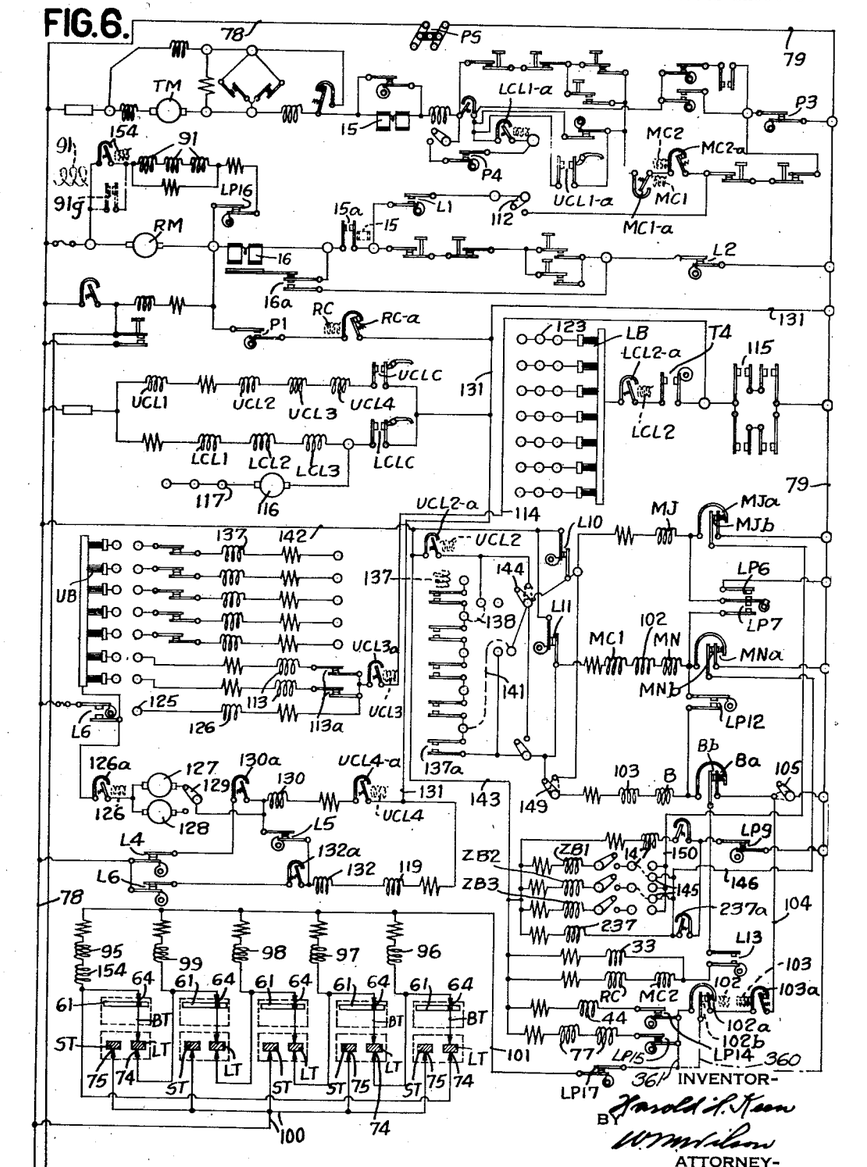
Figs. 6 and 7 together form a circuit diagram for the machine, Fig. 6 being placed above Fig. 7.

Referring now to Fig. 6 the short transfer segments are connected through the segments 73 (not shown on this figure) and brushes 75 to a line 100. Each long transfer segment LT is connected through the corresponding segment 72 (not shown on this figure) and brush 74 to the brush 64, the segment 61 and the brush BT of the next lower denomination. Each brush BT is connected to the coil of a transfer relay. The connections are such that the units brush BT is connected to the tens transfer coil 96, the tens brush to the hundreds coil 97, the hundreds brush to the thousands coil 98, the thousands brush to the ten-thousands coil 99 and the ten-thousands brush to the units coil 95. In the example just considered and shown to the right of Fig. 8, the tens brush BT was on the short transfer segment ST. Accordingly, a circuit is established which extends from the line 78 through the line 100, the tens segment ST, the tens brush BT, the hundreds magnet 97, a line 101, cam contacts LP17, relay contacts 102a and 103a closed at this time, a line 104 and a switch 105 to the line 79.

The hundreds relay 97 is thus energized and closes the contacts 97b and opens the contacts 97a, as shown in the upper right hand corner of Fig. 8. The sectors are in this case positioned for the subtraction of 3 from 9 and consequently the brush B2 rests on the "six" segment 68. Since, however, the contacts 97a are open, no circuit can be established through the brush B2 and the segment 63. A circuit will, however, be established at the five time in the cycle through the contacts 97b, brush 65, the ring 62, the brush B4 and the "five" segment 68, so that "five" will be printed. Thus, the tens denomination can borrow from the hundreds denomination.

The contacts 91c connect the subtracting members to the printing magnets associated with the accumulator DB. Thus a positive balance, which is the excess of debit amounts over credit amounts and is thus a debit balance, will be printed in the same column of the report sheet as the debit total. In certain cases as for example when 187 is subtracted from 983, long borrowing must be effected. In the case taken, the brush BT of the units pairs of subtracting members engages the segment ST and that the tens pair of subtracting members have not been displaced relatively to one another so that they represent zero and their brush BT rests on their segment LT. Then, a circuit will be established from the line 100 (Fig. 6) through the units segment ST, the units brush BT, the tens transfer magnet 96 to the line 101, and also from the units brush BT through the tens long transfer segments LT and brush BT to the hundreds transfer magnet 97, so that not only will the units denomination borrow from the tens denomination but the latter denomination will borrow from the hundreds. In this manner long borrowing is effected.

In the example shown at the right hand side of Fig. 8 one decimal amount is subtracted from another. The sectors shown diagrammatically in Fig. 7 deal, however, with British currency amounts. The operation is the same except that the pence or units sectors are supplied with current through the duo-decimal emitter 86, while the other pairs of subtracting members are supplied with current through the decimal emitter 87. The use of the two emitters is necessary because the impulses for controlling the pence type bars must be more closely timed in order that they may occur within the same period of the cycle as the decimal impulses. The tens of shillings counter wheels in the two accumulators register one and naught alternately, but have the usual ten registering positions and transfer after every alternate step of movement, that is to say, if the counter wheel is in the position normally denoting five, it will register one.

The stepped cams associated with the tens of shillings wheels are formed, in a known manner, with alternate high and low portions so that they will cause the closure of the associated contacts 22 either at the "one" or the "zero" time in the cycle in accordance with the position of the counter wheels. Thus the tens of shillings sectors 48M and 48S will move either into the "one" or the "zero" position. There will, therefore, either be no displacement between them or one will be one step in advance of the other.

If there is no displacement the digit to be printed is "zero" or, if one is borrowed from the tens of shillings, "one". The brush B2 will be on the "zero" segment 68 and the brush B3 on the "nine" segment 68. The "nine" segment must thus be connected up so as to transmit an impulse at the "one" time when a borrowing operation occurs and the circuit extends through the brush B3. As shown in Fig. 7 the "one" and "nine" segments 68 are connected via the collecting rings 69 and brushes 70 to a line 109 which is connected through contacts 91 on to the line 94 that receives an impulse at the "one" time. If the sectors are displaced one step relatively to one another, the circuit will extend at the "one" time either through the brush B2 and the "one" segment 68 or through the brush B1 and the "nine" segment 68. If the sectors are displaced and a borrowing operation occurs, zero must be printed. The "zero" and the "eight" segments are involved in this case and are connected to a "zero" line 106. Whenever a "zero" is to be printed, however, no circuit is established and the type bar in these circumstances rises to its highest position to print zero in the usual manner. Further, the emitters 86 and 87 do not close the circuit at the "zero" time in the cycle; consequently the "zero" segments 68 are not connected to any of the contacts 91a. The "zero" segments 68 are operative during the printing of negative balances as will now be explained.

*Printing a negative balance*

The diagram to the left of Fig. 8 shows the subtracting members in the positions assumed when 819 is subtracted from 181. The actual difference between these numbers is printed as—638\*. It will be noted that two lower sectors are in position to give a reading of two and to effect a short transfer and borrow one from the tens sectors. These are in the position to give a normal reading of seven, but owing to the borrowing operation actually give a reading of six. The hundreds sectors give a reading of three. This would give a reading of 362 which is the true complement of the actual difference. It is preferred that the "nines" complement, which is one less than the true complement, should be obtained. The hundreds brush BT is on the short transfer segment ST in position to initiate a borrowing operation. As previously noted, the magnet 95 associated with the unit sectors is connected to the brush BT for the highest pair of sectors. Consequently, the contacts 95a will be open and the contacts 95b closed. Thus, the actual reading from the units subtracting sectors will be a reading of one made through the brush B3. The subtracting members are therefore in the position to give a reading of 361. Thus, the sectors are in position to represent the "nines" complement of the actual difference between the minuend and the subtrahend.

Translating mechanism is provided for the purpose of translating the complementary amount represented by the positions of the subtracting members into its "nines" complement so as to obtain the true difference. The coils 91 (top left hand corner of Fig. 6) which control the contacts 91a and 91c aforesaid, relay contacts 154 and cam contacts LP16 are connected in parallel with the reset motor RM so that the coils can only be energized while the reset motor is operating. The contacts in relay 154 are normally open and are controlled by the coil in the relay 154 which is in series with the units transfer magnet 95. Thus, whenever a unit is borrowed from the units denomination, which borrowing indicates that a negative (or credit) balance has been obtained, the coil is energized and closes its contacts 154 to energize the coils 91. This circuit is held throughout the remainder of the two cycles constituting a balancing operation.

The coils 91 then open the contacts 91a and close the contacts 91b so as to connect the lines 94 to the lines 93 in reversed order. The arrangement is such that the "nine" line 94 is connected to the "zero" line 93, the "eight" line 94 to the "one" line 93 and so on, the "one" line 94 being connected to the "eight" line 93 and the "nine" line 93 being disconnected. Thus, assuming that a printing circuit extends through the "one" segment 68 of a pair of subtracting members it will receive an impulse at the "eight" time instead of at the "one" time, and "eight", which is the complement with respect to nine of "one", will be printed. Similar cross-over connections 108 are provided, so that the connections between the pence lines 89 and the lines 92 may be reversed. Further, the "one" line 94 is disconnected from the line 109 and is connected to the line 106 through the contacts 91b so that the "zero", "two", "four", "six" and "eight" segments 86 of the tens of shillings subtracting member will receive impulses at the "one" time in the cycle. Thus, the printing circuit is established at times complementary to the digits represented by the positions of the subtracting members, and the complement of the complement of the difference, that is the actual difference, will be printed.

The reason for effecting a borrowing operation from the units denomination when the subtrahend exceeds the minuend is to convert the true complement which would otherwise be obtained into a "nines" complement by subtracting one. The translation of the true complement into the actual difference presents difficulties which do not arise in the case of the "nines" complement, and the mechanism is thus simplified by arranging the translating mechanism to obtain the "nines" complement.

The printing circuits in the case of a negative difference extend through the emitters 86 and 87, the subtracting members, the triple contacts 97a or 97b, the lines 110, contacts 91d which are closed by one of the coils 91, lines 111, the printing magnets 18 which print the credit totals and are associated with the credit accumulator, and the usual cam contacts to the line 79. It will thus be seen that a negative balance, that is, a credit balance, is printed in the same column as the credit totals.

Control circuits of the machine

The control circuits of the machine and the manner in which the subtracting mechanism is brought into action to obtain a balance will now be explained. The circuits of the machine are generally similar to those described in U. S. Patent No. 1,762,145 and used in machines of this class and therefore need only be described briefly.

During card feeding operations the tabulating motor TM is held energized by a circuit extending from the line 78 (Fig. 6) through the motor, the card feed clutch magnet 15, card lever relay contacts UCL1a, motor control relay contacts MC1a and MC2a and cam contacts P3 to the line 79. This circuit will be interrupted by the opening of either the contacts MC1a or MC2a in a manner to be explained later. The motor TM and magnet 15 will thus be deenergized and the latter will allow its contacts 15a to close. Cam contacts L1 close at the end of each card feeding cycle so that, as soon as the contacts 15a close, a circuit will be established from the line 78 through the reset motor RM, the reset clutch magnet 16, the contacts 15a, the contacts L1, a switch 112, (assuming this switch to be closed) and the contacts P3 to line 79. The magnet 16 closes contacts 16a to establish a holding circuit for itself and the reset motor through cam contacts L2. The reset motor thus rotates and the reset clutch is engaged so that the machine performs one or more total printing cycles.

Towards the end of each cycle cam contacts P1 close momentarily to short circuit the magnet 16 through reset control relay contacts RCa. Then the contacts 16a open to break the holding circuit. Later in the cycle the contacts P1 re-open to deenergize the motor RM. It will be appreciated that if the reset control contacts RCa are open when the contacts P1 close, the magnet 16 will not be short circuited and the reset motor circuit will be maintained for another total printing cycle. Thus, the contacts RCa provide means by which the number of consecutive total printing cycles performed may be controlled. As each card passes the upper brushes it closes card lever contacts to energize relays UCL1 to UCL4 and as it passes the lower brushes it closes contacts LCLC to energize relays LCL1 to LCL3. These relays are the usual card lever relays for controlling the machine in accordance with whether or not cards are being fed.

Reading the cards and distributing amounts read to accumulators

As each card passes the upper brushes circuits are established from the line 78 through cam contacts L6, the upper brushes, suitable plug connections, pence translator magnets 113 and contacts 113a, card lever relay contacts UCL3a (closed while cards are passing the upper brushes) a line 114, and cam contacts 115 to the line 79. The contacts 115 are the usual contacts provided to prevent sparking at the brushes. The magnets 113 control pence translators of the kind described in British Patent No. 288,360 (in which specification they are referred to as impulse changing devices). One of these translators is indicated diagrammatically at 116 and is connected between the lower card lever contacts LCLC and plug sockets 117. As these translators are well known they need not be described in detail and it will be sufficient to say that each translator is adjusted by its magnet 113 to register a digit read by an upper brush during one card cycle and is operable, during the next card cycle, to emit an impulse representing that digit in synchronism with the cycle of the accumulators.

One of the sockets 117 is connected to a socket 118 (Fig. 7) which through contacts 119a is connected to a socket 120. The sockets 120 are connected by plug wires 121 to sockets 122 connected to the counter magnet 17 of the accumulator DB. The plug sockets 123 (Fig. 6) connected to the lower brushes are also connected by plug wires to the sockets 118 (Fig. 7).

Thus, as the cards pass the lower brushes, circuits will be established through the contacts 115 (Fig. 6), contacts T4, card lever relay contacts LCL2a, the lower brushes LB, plug sockets 123 to the plug sockets 118 (Fig. 7) and in parallel through the line 131 (Fig. 6), the lower card lever contacts LCLC, a pence translator 116, and the socket 117 to the units plug socket 118 (Fig. 7). From the sockets 118 the circuits extend to normally closed contacts 119a (Fig. 7) of a distributing relay, sockets 120, plug wires 121, the counter magnets 17 of the accumulator DB, a bus 135 and wire 136 to the supply line 78. The magnets 17 will thus be energized so as to cause the accumulator DB to add the amounts read from the cards. This accumulator should, however, only add debit amounts, and credit amounts should be added by the accumulator CR. When a credit amount is read from a card the contacts 119a are opened and contacts 119b are closed by the energization of a distributing relay coil 119 (Fig. 6). The entering circuits will then extend through the contacts 119b, the plug sockets 133, plug wires 134, plug sockets 124 and the counter magnets 17 of the accumulator CR. Thus, all debit amounts will be added by the accumulator DB and all credit amounts by the accumulator CR. The control of the distributing relay 119 will now be described.

As is customary, all cards having debit amounts are provided with a hole in a predetermined position of a selected column, while all cards having credit amounts have a hole in a different position of a selected column. Thus, a hole in any of the positions 0 to 4 of the column denotes a debit and a hole in any of the positions 5 to 9 a credit. Assume that a "one" hole denotes a debit and a "six" hole denotes a credit.

The upper brush UB reading this so-called designating column is plugged to a socket 125

(Fig. 6). When a hole is read a circuit is established through contacts L6, the upper brush in question, a relay coil 126, the contacts UCL3a and the line 114. The coil 126 closes its contacts 126a. These contacts are in a circuit including two circuit makers 127 and 128. The first of these is timed to close while the holes 5 to 9 inclusive are being read and the second while the holes 0 to 4 are being read. By means of a switch 129 either circuit maker can be placed in circuit. With the switch in the position shown in full lines a circuit can be established when a "six" hole is read but not at the time when a "one" hole is read. Thus, if a debit card passes the upper brushes, the coil 126 will be energized through a "one" hole and will close its contacts 126a but no circuit will be established through these contacts, since the circuit maker 127 is open. On the other hand, if the coil 126 is energized through a "six" hole, a circuit will be established from the line 78 through the cam contacts L6, the relay contacts 126a, the circuit maker 127, the switch 129, the relay coil 130, card lever contacts UCL4a and a line 131 to the line 79. The coil 130 closes its contacts 130a to establish a holding circuit for itself through contacts L4. The contacts L4 are closed while a card is actually passing the upper brushes and, before they open, cam contacts L5 close and establish a circuit through the cam contacts L4, the contacts 130a, the contacts L5, a relay coil 132, the relay coil 119 and the line 131 to the line 79.

The coil 132 closes its contacts 132a to provide a holding circuit for itself and the coil 119 through cam contacts L6, which close before the contacts L4 and L5 open and remain closed until after the zero hole on the card has passed the lower brushes in the next cycle. The relay coil 119 opens its contacts 119a (Fig. 7) and closes its contacts 119b to direct the entry into the credit accumulator CR.

*Automatic control*

The machine is provided with automatic major and minor group control mechanism, which compares a group number on each card with the number on the following card and interrupts the operation of the machine if these numbers disagree. Disagreement between the group numbers will occur at the end of each group of cards and is usually referred to as a group change. The automatic control mechanism initiates a total printing cycle on a group change in which a minor total is printed if a minor group change occurs and both a major total and a minor total are printed if a major group change occurs. It will be understood that the cards may be divided into major groups each of which may be sub-divided into minor groups. The automatic control mechanism is of a known kind but will be described briefly to assist in an understanding of the present invention.

Group control magnets 137 (Fig. 6) are plugged between certain upper brushes UB and corresponding lower brushes LB which read the record card field containing the perforated group number. The cards are fed in succession, first under the upper brushes and then under the lower brushes. If the cards under the brushes contain the same group number perforations, series circuits are completed through the brushes, and the magnets 137 are energized and act to close related contacts 137a. If the analyzed cards have differing group number perforations, one or more of the magnets 137 are deenergized and the associated contacts 137a are opened.

The relays 137—137a constitute a comparing unit by which group changes are detected and can be divided into two sections. The contacts 137a are connected in series and by means of a plug wire 139 as many of them as are in use may be connected in series between contacts UCL2a and a minor control circuit comprising relay coils MC1, 102 and MN. When the machine is employed with major and minor control, those of the contacts 137a which are controlled from the field on the card containing the major group number are connected by a plug line 141 in series with a major relay coil MJ, so as to divide the contacts 137a into two sections. Normally, circuits extend from the line 78 through a line 142, cam contacts L10, the coil MJ and contacts MJa held closed by the coil MJ to the line 79, and also from the line 142 through contacts L11, the coils MC1, 102 and MN, and contacts MNa closed by the coil MN to the line 79. The contacts L10 and L11 open momentarily at the end of each card feed cycle, but if no group change has occurred the circuit for the relay coils MJ and MN will be maintained through the closed contacts 137a. If the minor group has changed, the contacts 137a associated with the minor group will have opened and the relay MN will be deenergized but the major group contacts 137a will be closed, maintaining the relay MJ energized. If the major group changes, both relays will be deenergized, since the holding circuit for the coil MN extends through the major group contacts 137a. It will be seen that on a group change, whether major or minor the coil MC1 will be deenergized, and will allow its contacts MC1a to open and interrupt the tabulating motor circuit. The reset motor is then energized, as explained previously, and a total printing cycle follows. The contacts LP6 and LP7 are provided for the purpose of setting up magnets MJ and MN after they have been deenergized due to a group change. Toward the end of each reset cycle initiated by hand or automatically, contacts LP6 and LP7 are closed momentarily to energize magnets MJ and MN. The energized magnets then close related relay contacts MJa and MNa to form holding circuits therethrough to condition the magnets for a group control comparing operation.

For simplicity it will be assumed that the machine is operated under one group control only, the plug connection 141 being omitted, and a switch 144 being closed to short circuit the contacts L10 and maintain the magnet MJ permanently energized. Then, at the end of each group of cards the coils MC1, 102 and MN will be deenergized. When the coil MN is deenergized, the contacts MNa open to break the circuit and its contacts MNb close to connect sockets 145 to the line 79 through a line 146. The sockets 145 will be connected by suitable plug connections to the sockets 147 which are connected to the magnets ZB1 and ZB2. The circuit through magnets ZB1 and ZB2 continues through wires 143 and 142 to the other line 78. Thus, these magnets will be energized during the total printing cycle following a change of group and will, as explained previously, connect the reading out contacts 22 of the accumulators DB and CR to the line 78. The magnets ZB1 and ZB2 also engage conventional zero button clutches which couple the accumulators DB and CR to the reset shaft 13 (Fig. 1) so that these accumulators are reset in a known manner after their totals have been printed and transferred to the subtracting mechanism. The contacts MNb also close a circuit through a relay coil 237 which closes its contacts 237a so as to provide a holding circuit for itself and the coils ZB1 and ZB2 through the cam contacts LP9. These contacts open at the end of each total printing cycle to deenergize the coils 237, ZB1 and ZB2. Thus the coils ZB1 and ZB2 will be energized during the whole of a single total printing cycle but not during a second consecutive total printing cycle.

*Balance printing control circuits*

The machine is provided with a balance control circuit comprising a relay B similar to the relays MN and MJ and a coil 103. By means of a switch 149 the balance control circuit can be connected in parallel with either the major control circuit or the minor control circuit so that it is deenergized whenever the associated major or minor control circuit is broken. It will be assumed that the switch 149 is in the dotted line position so that a circuit extends from the cam contacts L11 through this switch, the coils 103 and B, the contacts Ba and a switch 105 to the line 79. The switch 105 is closed when balancing operations are desired.

On a group change the minor circuit, including the relay coil MN and the balance control circuit, including the coil B will both be deenergized. The contacts Ba will thereupon be opened and the contacts Bb closed. A circuit will thereupon be established from the line 79, through the switch 105, the contacts Bb, cam contacts L13, in parallel through the subtracting magnet 33 and the coils of the relays RC and MC2 and the lines 143 and 142 to the line 78. The coil MC2 opens its contacts MC2a further to break the circuit of the tabulating motor and the coil RC opens its contacts RCa so as to prevent the interruption of the reset motor circuit by the contacts P1. The magnet 33 attracts its armature 32 (Fig. 3) to release the pawl 29 and allow of the shaft 25 being driven, all as previously explained. This shaft then draws the subtracting members forward and the latter are differentially positioned under the control of their magnets 58. The coil 103 being deenergized its contacts 103a close, but the contacts 102a in series with the contacts 103a open upon the deenergization of the magnet 102 so that no circuit is established.

The total printing cycle which then follows results in the printing of the debit and credit totals and the transfer of these totals to the subtracting mechanism. Towards the end of this cycle contacts LP12 close without producing any effect. A little later cam contacts LP6 close but since the major circuit is already completed, produce no effect. After the contacts LP6 have reopened, cam contacts LP7 close momentarily and establish a circuit from the line 79 through the contacts MJa, which are held closed by the coil MJ, the contacts LP7, the coils MN, 102, and MC1, the contacts L11 and the line 142 to the line 78. The coil MN opens its contacts MNb so that the zero button magnets ZB1 and ZB2 are deenergized when the cam contacts LP9 open at the end of the cycle and interrupt the total printing and transferring circuits by allowing the contacts ZB1a and ZB2a to open.

The coil MN also closes its contacts MNa to provide a holding circuit for itself and the coils 102 and MC1. The coil MC1 closes its contacts MC1a. The coil RC is, however, still energized and holds its contacts RCa open so that the reset motor will continue to rotate for another cycle and the coil MC2 is energized and holds its contacts MC2a open interrupting the tabulator motor circuit.

The coil 102 is now energized and closes its contacts 102a completing the transfer circuits through the cam contacts LP17 and the transfer brushes and segments of the subtracting mechanism, as explained previously. The contacts LP17 are closed during the whole of the balance printing portion of the cycle. The cam contacts LP15 also close during the whole of the balance printing portion of the cycle to complete a circuit through the multi-contact relay coils 77 and the lines 143 and 142. The coils 77 then open their contacts 77a, close their contacts 77b so as to interrupt the circuits for the magnets 58 and prepare balance printing circuits which have been explained previously. It will be noted that, since the contacts 102a are open during the first total printing cycle, the coils 77 will be deenergized and their contacts will be in the condition shown in Fig. 7, preparing the total printing and transferring circuits. Just before the sector 22 reaches the position shown in chain lines in Fig. 4 during the second or balance printing cycle, cam contacts LP14 close to energize the restoring magnet 44 which attracts its armature 43 (Figs. 3 and 4) so that the shaft 25 and the subtracting members may be restored in the manner explained previously. The balance is printed in the appropriate column of the report sheet in the manner previously explained.

During the second half of the second or balance printing cycle, the cam contacts LP12 close, completing a circuit through the contacts MNa which are closed by the minor relay MN, the contacts LP12 and the balance relay coil B and the relay coil 103. The relay coil B will thus be re-energized and close its contacts Ba to provide a holding circuit for itself and the coil 103. The opening of the contacts Bb interrupts the circuit for the subtracting magnet 33 which will release its armature 32 so that the tail 31 and the pawl 29 will be disengaged from the notch 27a by the armature 32, as the subtracting mechanism is restored to normal. The opening of the contacts Bb also deenergizes the relay coils MC2 and RC. The contacts MC2a will thereupon close so that the tabulating motor circuit can be completed by the closure of automatic restart cam contacts P4 in a known manner. The coil RC allows the contacts RCa to close so that the cam contacts P1 can break the reset motor circuit, as previously explained. The machine will then resume tabulating the cards of the next group. The coil 103 is now energized and holds the contacts 103a open to break the circuits for the magnet 44, the coil 77 and the transfer magnets 95 to 99.

If the switch 149 is placed in the dotted line position the relay coils B and 103 will not be deenergized on a minor group change but only on a major group change. Consequently, the subtracting magnet 33 and the coils MC2 and RC will be energized on a major group change only, so that if a minor group change occurs the card feed will be resumed after a single cycle only. Thus, a balance printing cycle will only take place on a major group change. With this adjustment the coil 103 remains energized and its contacts 103 open when a minor group change occurs so that the various subtracting circuits established through these contacts will not be made. It will be understood that the magnets ZB1 and ZB2 will in this case be plugged to a line 150 which extends to the contacts MJb of the major relay so that total printing from the accumulators DB and CR will only take place on a major group change. The minor totals are obtained by entering the amounts into other accumulators which are reset and have their totals printed on a minor group change.

In the machine illustrated it is possible to adjust one or more accumulators to obtain progressive totals, that is, a series of totals printed without resetting the accumulators. As the manner in which this is done is well known, it will not be described. For example, see Patent No. 1,896,540, granted February 7, 1933 to G. F. Daly, et al. It should, however, be noted that if the accumulators DB and CR were adjusted to obtain progressive totals then progressive balances would also be obtained without any further adjustment of the machine.

*Modified transfer mechanism*

In a modified arrangement of the subtracting mechanism, Fig. 9, transfers are effected by allowing the minuend sectors to move forward one step. By reference to Fig. 8, it will be noticed that, if a minuend sector is allowed to move forward, that is, downwardly, one step, the brush B1 or B2 will engage with the segment 68 for the next lower digit.

With this modification the brushes B3 and B4 are omitted, as is also the collector ring 62. The transfer magnets 95 and 99 each control an escapement mechanism cooperating with the associated minuend sectors. The escapement mechanism includes an interposer member 351, Fig. 9, slidably pivoted at 352 and adapted to be inserted between the tail portion 151 of the pawl 53 associated with a minuend sector 48M and an operating lever 353 pivoted at 354. The operating levers, of which there is one for each minuend sector, are rocked by the sector 225 when it strikes the end 355 as it makes its first outward movement. Normally, with the transfer magnets deenergized, the interposers 351 will not be between the pawls and the operating members, which latter can rock without influencing the pawls. The transfer magnet 95 is energized to move its interposer 351 between the associated pawl 53 and operating member 353 so that the pawl will be rocked by the operating member 353 far enough to free the minuend sector but will not be far enough for its tail 55 to latch a nose 56. The minuend sector will move until it engages a tooth 356 on the operating member 353. As the latter rocks back under the urging of spring 357, the pawl will re-engage the minuend sector before the tooth 356 on the rocking member 353 releases the sector. The minuend sector will thus move one step.

With this type of transfer the magnets 95 to 99 must be energized during the first total printing cycle. To allow of this, the contacts LP17 are connected, as shown in chain lines 360 in Fig. 6, to contacts 102b which close when the coil 102 in the minor control circuit is deenergized, the line 152 being interrupted by taking out the short wire 361. In this case the cam contacts LP17 close, as the sector 22 moves into its extreme position, to energize those transfer magnets whose circuits have been prepared. The transfer circuits will be broken during the balance printing cycle by the opening of the contacts 102b.

Since the circuit through the contacts LP17 is in this modification only established momentarily, the coil 154 will only be energized momentarily and its contacts will only close momentarily to energize the coils 91. The circuit for these coils are held through contacts 91g closed by one of them and connected, as shown in chain lines in Fig. 6, in parallel with the contacts 154.

*Designating totals and balances*

Each bank of type bars includes a special designation type bar which is provided in the "nine" type position, with a special type for printing an asterisk. During total printing cycles, contacts 157 (Fig. 7) close at the "nine" time to complete a circuit through normally closed contacts 77c to a printing magnet 156 which arrests the special type bar with the asterisk type in printing position. An asterisk will thus be printed against all totals so as to distinguish them from amounts listed in a known manner directly from the cards. During balance printing cycles, the contacts 77c are opened and contacts 77d are closed by the coils 77 to prepare balance designating circuits. The special type bar associated with the accumulator DB is provided, in the "eight" type position, with a type for printing the symbols DB while the special type bar associated with the accumulator CR is provided in the same position with a type for printing the symbols CR.

If the balance to be printed is debit, contacts 91e will be closed. If, however, the balance is credit, the relay coils 91 will be energized and will open the contacts 91e and close the contacts 91f. Cam contacts LP18 close at the "eight" time in the total printing cycles of the machine and, during the balance printing cycles, a circuit is established from the line 78 through the cam contacts LP18, a line 158, the contacts 91e, assuming the balance is a debit balance, a line 159, the contacts 77d and the magnet 156, associated with the accumulator DB. This magnet arrests its type bar with the "DB" type in printing position, so that "DB" is printed against a debit balance. If, on the other hand, the balance is credit, contacts 91e will be opened and the contacts 91f closed. The circuit will then extend through the contacts 91f and a line 160 to the magnet 156 associated with the accumulator CR. Thus, the symbol "CR" will be printed against the credit balance.

*General operation*

The operation of the machine as a whole will now be described. The cards are placed in the magazine of the machine and the latter is started in a known manner which need not be described. Amounts are read from the cards by the lower brushes LB and distributed either to the accumulator CR or the accumulator DB through the distributing relay contacts 119a and 119b in accordance with the position of a hole in the "designating" column of the card. This hole indicates whether the card contains credit or debit amounts. The amounts read may also be listed in a known manner which need not be described.

Assume that the machine is operating under minor control only. The switch 149 is placed in the full-line position and the switch 144 is closed to maintain the major control circuit constantly energized. The reading of the cards continues until the first group has been read when a group change occurs and the minor control circuit is broken.

The motor control relay MC1 (Fig. 6) is then deenergized and the clutch magnets ZB1 and ZB2 energized so that a total printing and resetting cycle follows. The balance control circuit also fails so that the relays MC2 and RC are energized and cause the machine to perform a second resetting or balance printing cycle. The failure of the balance control circuit results in the subtracting magnet 33 being energized through the contacts Bb. This magnet clutches the shaft 25 to the gear wheel 28 (Figs. 2 to 5) and the shaft turns and draws the subtracting sectors 48 after it. Total printing circuits are established during the first total printing cycle and extend through the subtracting mechanism, the control magnets 58M and 58S (Fig. 7) and the printing magnets 18. The credit totals and debit totals are thus printed and the sectors 48 positioned to obtain a balance. At the end of this cycle the minor control circuit is re-established through the contacts LP7 (Fig. 6) and the coils MC1 and 102 are re-energized.

The coil 102 closes its contacts 102a and the contacts 103a being closed now, the coils 77 are energized to prepare the balance printing circuits by closing their contacts 77b and 77d (Fig. 7). The closure of the contacts 102a (Fig. 6) also completes the circuits for those of the transfer magnets 95 to 99 as have their energizing circuits prepared by the brushes BT and segments ST and LT. If the balance is negative the coil 154 is energized and energizes the coils 91 which open the contacts 91a and 91c and close the contacts 91b and 91d so as to convert the amount registered by the subtracting members into its complement and cause it to be printed by the type bars that print credit totals. If the balance is positive, the coil 154, and therefore the coils 91 remain deenergized and the amount registered by the subtracting members is printed by the type bars that print debit totals. Towards the middle of the balance printing cycle the restoring magnet 44 (Fig. 6) is energized, through the cam contacts LP14 and the relay contacts 102a and 103a, and releases the stop member 34 and pawl 42 (Fig. 4) so that the subtracting mechanism is restored to normal.

The balance control circuit is re-established at the end of this cycle through the contacts LP12 so that the relays MC2 and RC are deenergized and card recording operations are resumed. Thus a credit total, a debit total and a balance is printed for each minor group. If the machine is operated under major and minor control with the switch 144 open and the switch 149 in the dotted-line position, the balance control circuit will remain energized when the minor group changes and the minor control circuit fails. The relays MC2 and RC will remain energized so that only one total cycle will occur. Further, the contacts Bb will remain open so that the subtracting magnet 33 will not be energized. The subtracting mechanism will thus not operate since the clutch pawl 29 will be held away from the disk 27 by the armature 32. The minor totals are accumulated in an additional pair of accumulators to which the amounts are distributed in the same manner as they are distributed to the accumulators DB and CR. On a major group change, however, the balance control circuit is broken and a balance is printed as described above.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine of the class described, a pair of accumulating devices, means for operating said devices so that the one represents a minuend digit and the other a subtrahend digit, a pair of members each controlled by an associated accumulating device, means under control of said devices for moving said members so that the displacement of one member relatively to the other is representative of the difference between the minuend and subtrahend digits, and a recording device controlled by the pair of members for recording the digit represented by the relative displacement between the pair of members.

2. In a machine of the class described, a pair of accumulating devices, means for setting said devices so that one represents a minuend digit and the other a subtrahend digit, a pair of subtracting members, means for moving said members, a pair of detent devices each associated with a member, means under control of each accumulating device for operating a related detent device to interrupt the movement of said member when it has moved to an extent proportional to the value of the digit represented by said accumulating device, and a recording device controlled by the pair of members for recording the digit represented by the relative displacement between the pair of members.

3. In a machine of the class described, a plurality of accumulating devices arranged in pairs for each denomination, means for adjusting one device of each pair in position to represent a minuend digit and the other device in position to represent a subtrahend digit, subtracting members one for each device, means under control of each of said devices for setting a related member, transfer devices, means under control of each pair of members of a lower denomination for operating said transfer devices when the members are displaced relatively to one another in a predetermined direction to control the members of the next higher denomination so as to reduce by one the digit represented by their relative displacement, and recording devices controlled by the members to record the digits representing the difference between the minuend and subtrahend.

4. In a machine of the class described, two sets of accumulating devices arranged in denominational pairs, means for adjusting one set of devices to differential positions representing minuend digits and the other set to differential positions representing subtrahend digits, subtracting members one for each device, means under control of said devices for setting said members, transfer devices between pairs of members including transfer electromagnets for initiating a borrowing operation, "short transfer" contact members associated with a pair of lower order subtracting members to close the energizing circuit of the magnet in the higher order when said pair of members are displaced relatively to one another in a predetermined direction, and recording devices controlled by the subtracting members to record digits representing the difference between the minuend and subtrahend.

5. In a machine of the class described, accumulating devices arranged in pairs, means for adjusting one device of each pair in position to represent a minuend digit and the other device in position to represent a subtrahend digit, subtracting members one for each device, means under control of said devices for setting said members, transfer devices comprising an escapement mechanism, means under control of a pair of members of lower denomination when they are displaced relatively to one another in a predetermined direction for operating said transfer devices to permit one member of the associated higher pair of subtracting members to move one step so as to diminish by one the digit represented by that pair of members, and means under control of said members for recording the difference between the minuend and subtrahend.

6. In a machine of the class described, two sets of accumulating devices arranged in denominational pairs, means for adjusting one set of devices in position to represent minuend digits and the other devices in position to represent subtrahend digits, subtracting members one for each device, means under control of said devices for setting said members, transfer devices, means under control of a pair of members of a certain denomination when they are displaced relatively to one another in a predetermined direction for operating said transfer devices to adjust the members of the next higher denomination so as to reduce by one the digit represented by their relative displacement, and means in said transfer devices arranged to be placed by said certain pair of members, when not displaced relatively under control of the next lower transfer device, so that said next lower members when adjusted cause said next higher members to be adjusted also for "long borrowing", and recording devices controlled by said members for recording the digits representing the difference between the minuend and subtrahend.

7. In a machine of the class described, two sets of accumulating devices arranged in denominational pairs, means for adjusting one set of devices in differential positions to represent minuend digits and the other set in differential positions to represent subtrahend digits, subtracting members one for each device, means under control of said devices for setting said members, transfer devices between pairs of members including transfer electromagnets for initiating a borrowing operation, "short transfer" contact members associated with a pair of lower order subtracting members to close the energizing circuit of the magnet in the next higher order when said lower order pair of members are displaced relatively to one another in a predetermined direction, "long transfer" contact members associated with each pair of subtracting members and arranged to connect the magnet in the next higher order with the borrowing contacts of the next lower order when the subtracting members are not displaced relatively to one another, and recording devices controlled by the subtracting members to record digits representing the difference between the minuend and subtrahend.

8. In a machine of the class described, a pair of accumulators, means for entering positive amounts into one accumulator and negative amounts into the other accumulator and thereby adjusting said accumulators to differential positions representing said amounts, means operative after operation of the amount entering means for reading totals of the amounts entered into said accumulators, subtracting members, means under control of said total reading means for adjusting said members during the total reading operation, and means under control of said subtracting members for recording the difference between the positive and negative amounts.

9. In a machine of the class described, a pair of accumulators, means for entering positive amounts into one accumulator and negative amounts into the other accumulator and thereby adjusting said accumulators to differential positions representing said amounts, means for reading totals of the amounts entered into said accumulators, subtracting members, means under control of said total reading means during the total reading operation for adjusting said members to represent the balance amount or difference between the positive and negative amounts, devices under control of said total reading means for recording the entered balance amount, and translating mechanism arranged to receive an amount from the said subtracting members and enter into said recording devices that amount or the nines complement of that amount selectively depending whether the amount is a true number or a complement respectively.

10. In a machine of the class described, a pair of accumulators, means for entering positive amounts into one accumulator and negative amounts into the other accumulator and thereby adjusting said accumulators to differential positions representing said amounts, means for reading totals of the amounts entered into said accumulators, subtracting members, means under control of said total reading means for adjusting said subtracting members during total reading, in two operating cycles, means under control of said subtracting members for recording the difference between positive and negative amounts, and driving mechanism arranged automatically to move the subtracting members into differential positions as controlled by said adjusting means during the first of said cycles and to restore them after recording has been effected in the second of said cycles.

11. In a perforated record controlled machine arranged to be controlled by grouped record cards, a pair of accumulators, means for entering positive amounts into one accumulator and negative amounts into the other accumulator and thereby adjusting said accumulators to differential positions representing said amounts, a pair of printing mechanisms for printing totals of the amounts entered into said accumulators, means under control of said accumulators for adjusting said printing means for operation, automatic group control mechanism, subtracting members, means for bringing said members into action under control of said group control mechanism, means for adjusting said members under control of said accumulators during the total printing operation, and means under control of said subtracting members for operating either of said printing mechanisms for printing a record of a positive or negative balance.

12. In a machine of the class described, a pair of accumulating devices, means for setting said devices so that one is positioned to represent a minuend digit and the other is positioned to represent a subtrahend digit, a subtracting member provided with a set of controlling elements each allocated to a different one of the ten digits, means under control of one of said devices for adjusting said member, another member provided with a reading element arranged to cooperate with said elements and to select one of said elements in accordance with the relative displacement between the members, means under control of the other device for adjusting said another member, and a recording device controlled by the selected element to record the digit representing the relative displacement between the members.

13. In a machine of the class described, a pair of accumulating devices, means for setting said devices so that one is positioned to represent a minuend digit and the other is positioned to represent a subtrahend digit, an electric commutator provided with a set of conducting segments one for each of the ten digits, means under control of one of said devices for adjusting said commutator, a conducting brush, means under control of the other device for adjusting said brush, said brush being arranged to contact with a selected one of said segments in accordance with the relative displacement between the devices, an impulse emitter, and a recording device controlled by an impulse from said emitter and through said brush and segment for recording the digit representing the relative displacement between the devices.

14. In a machine of the class described, a pair of accumulators comprising accumulating devices arranged in pairs, there being one pair of accumulating devices for each denomination, means for adjusting one device of a pair in position to represent a minuend digit and the other device of said pair in position to represent a subtrahend digit, a subtracting member mounted for adjustment and provided with a set of digital controlling elements each allocated to a different digit, means under control of one device of said pair for adjusting said subtracting member, another subtracting member mounted for adjustment and provided with a reading element arranged to select one of said digital elements and another reading element arranged to select the digital element next lower in digital value, means under control of the other device of said pair for adjusting said other subtracting member, a pair of similar subtracting members of lower denomination, a transfer device, means under control of said pair of members of lower denomination when they are displaced relatively to one another in a predetermined direction for operating said transfer device to render effective the reading element selecting the lower digital element, and recording means under control of said effective reading element and the selected digital element for recording the digit representing the difference between the minuend and subtrahend.

HAROLD HALL KEEN.